United States Patent Office 3,393,763
Patented July 23, 1968

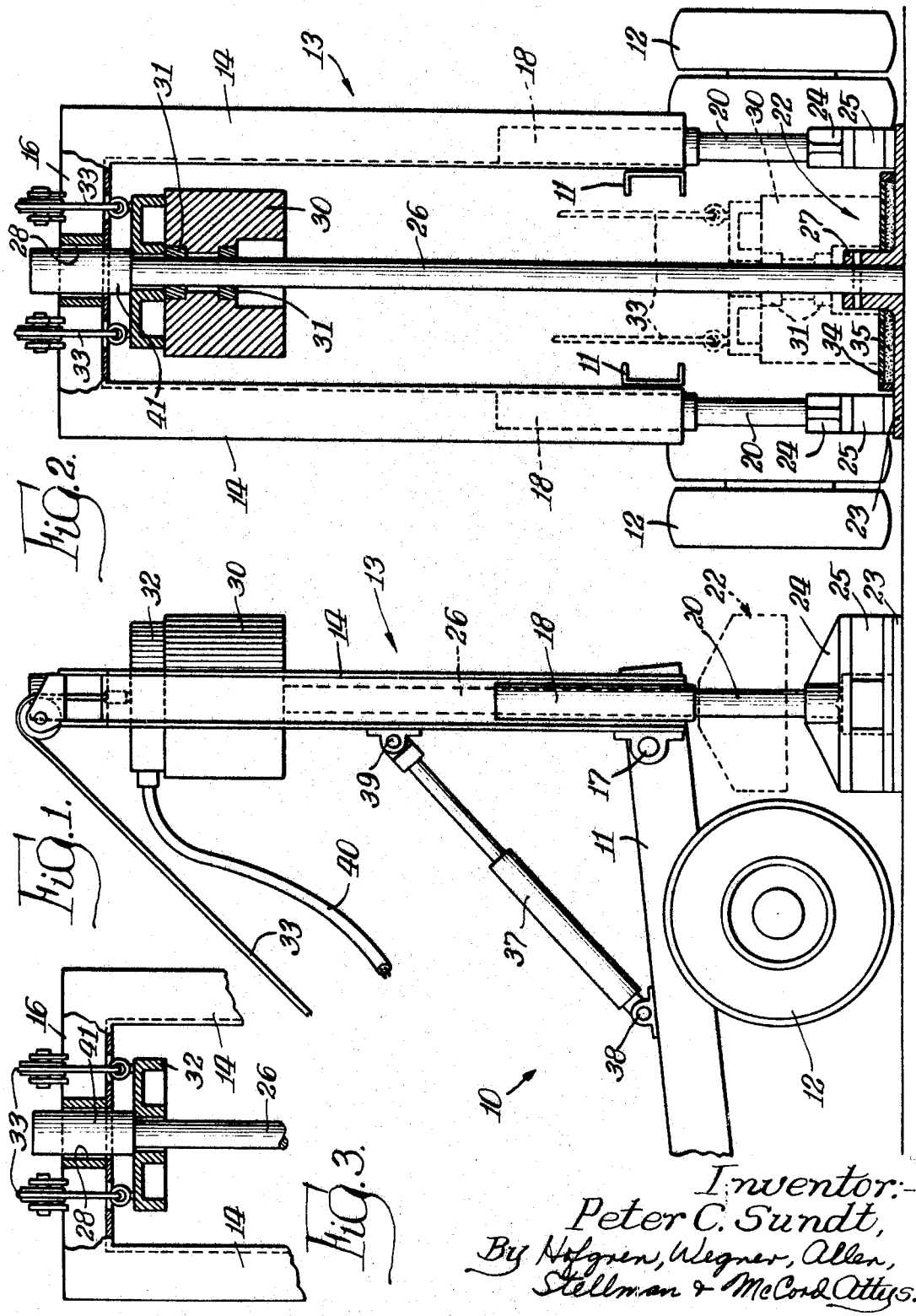

3,393,763
WEIGHT DROPPING APPARATUS FOR GENERATING A SEISMIC IMPULSE USEFUL IN GEOLOGICAL EXPLORATION
Peter C. Sundt, Houston, Tex., assignor to Mandrel Industries, Inc., a corporation of Michigan
Filed Aug. 3, 1966, Ser. No. 569,966
4 Claims. (Cl. 181—.5)

ABSTRACT OF THE DISCLOSURE

This invention provides a seismic shock generator for use in geological exploration, wherein a framework carrying a base plate is mounted on a mobile carrier in a fashion permitting the framework to swing to a vertical position under the influence of gravity. The framework includes guides which guide a weight droppable on the base plate so as to impart a shock to the ground therebeneath.

---

This invention relates to seismic apparatus and more particularly to apparatus for generating a seismic shock usable in profiling underlying earth strata particularly useful in the exploration for oil deposits.

It is a general object of the present invention to produce a new and improved seismic apparatus of the character described.

For many years oil exploration has been carried on through techniques which involved the creation of a seismic shock which generates seismic impulses or waves, which travel downwardly through the earth and are reflected from underlying strata or layers of rock. The reflected waves are detected by geophones or the like and the information thus received is recorded, composited, and otherwise rendered suitable for interpretation by geophysicists.

Perhaps the most commonly used method of creating a seismic shock is the explosion of a charge of dynamite at some distance below the surface of the earth, preferably at the base of the weathered layer. The dynamite method, however, has certain obvious limitations such as resulting danger or damage to surrounding structures, noise, and the cost and danger involved in planting and detonating explosive charges.

In recent years the technique developed by the late Dr. Burton McCollum has been extensively used, the method involving the generation of seismic shock energy by dropping a heavy weight from an elevated position onto the surface of the earth. The method of carrying out such weight dropping is shown in the McCollum Patent 2,851,121. While the weight dropping method has certain advantages over the dynamite technique, the fact that the wheels of the truck on which the weight is normally carried may be at a different elevation than the earth between the wheels (upon which the weight is dropped) has rendered it practically impossible to generate simultaneous seismic shocks from two weights dropped by two different trucks. Additionally, if the ground on which the weight is dropped is not level, a corner of the weight usually will strike the earth first, the balance of the weight impacting a fraction of a second thereafter. Such a drop often generates waves of inferior character.

The transfer of energy into the ground at two spaced points, the transfer taking place simultaneously, is felt to have certain advantages in producing records containing more useful information. Certain types of seismic equipment involving the explosion of a contained charge of gas lend themselves quite well to methods employing a plurality of wave generators delivering energy into the ground simultaneously. There are disadvantages, of course, to the gas explosion methods, not the least of which is the fact that oil exploration takes place in very remote areas of the world where the transport of explosive gases into the area of exploration can be exceedingly difficult and expensive.

According to the present invention, however, there is provided a method and apparatus wherein the basic principles of the weight dropping technique can be employed, but the arrangement is such that two or more of such apparatus may be used to deliver simultaneous shocks to the surface of the earth, thereby creating simultaneous impulses which produce a better record for subsequent interpretation by geophysicists. In addition, the present invention contemplates improved transfer of energy into the ground from an impact which may be in the form of a falling weight, which also improves the quality of the records which can be produced.

Other and further objects and advantages of the invention will be readily apparent from the following description and drawings, in which:

FIG. 1 is a side elevational view showing the apparatus of the present invention mounted on the rear portion of a truck bed;

FIG. 2 is an end view of the apparatus shown in FIG. 1; and

FIG. 3 is a fragmentary view showing the upper portion of FIG. 2, but with the apparatus in a different position.

While this invention is susceptible of embodiment in many different forms, there is shown in the drawings and will herein be described in detail a specific embodiment, with the understanding that the present disclosure is to be considered as an exemplification of the principles of the invention and is not intended to limit the invention to the embodiment illustrated. The scope of the invention will be pointed out in the appended claims.

Referring now to the drawings, there is shown a seismic apparatus 10 comprising a mobile carrier in the form of a truck having a chassis portion 11 carried by wheels 12 in the usual manner. A frame 13 includes a pair of side members 14 and a top member 16 swingably mounted on the chassis 11 of the truck by pivot bearings 17. The side members 14 each carry hydraulic piston and cylinder devices including cylinders 18 connected to piston rods 20. The piston rods carry a force transmitting member 22 which comprises a ground contacting metal plate 23 carried by brackets 24 mounted on the end of piston rods 20. Shock isolators 25 are interposed between the brackets 24 and the plate 23.

Guide means in the form of a steel tube 26 extends upwardly from a central boss 27 formed in the plate 23, with the guide means extending upwardly through an opening 28 in top member 16.

Slidably mounted on the guide means 26 is an impactor in the form of a weight 30 having a central opening surrounding the guide rod 26 with the opening being provided with low friction sleeve bearings 31.

Means are provided for raising the weight 30 to the elevated position shown in FIGS. 1 and 2 and quickly releasing it for gravity fall upon the force transmitting member, the quick release device taking the form of an electromagnet 32 carried by cables 33 connected to a hoisting device (not shown). The force transmitting member 22 is preferably provided with means for reducing the audible noise produced by operation of the device and thus may be provided with a plastic sheet or pad over a layer of sand 35 covering the upper face of the plate 23.

In operation, hydraulic fluid from a source (not shown) is applied to the cylinders 18 to raise the force transmitting member 22 to the position shown in dotted lines in FIG. 1, in which position the truck may be driven across the ground to the area where seismic impulses or shocks are to be generated. When the area is reached, the truck is stopped and hydraulic fluid is applied to the opposite ends of the cylinders 18 to lower the force transmitting member against the ground and to press it firmly thereagainst to the extent of jacking up the rear portion of the truck as shown in FIGS. 1 and 2. Inasmuch as the frame 13 is swingably mounted on the pivots 17, and the weight 30 is at this stage of the operation resting on the force transmitting member, the combined weight thereof is sufficient to orient the frame 13 and hence the guide means 26 in generally vertical position before the force transmitting member is actually pressed against the ground.

When the truck has been elevated as shown, the frame is locked in position by means of a hydraulic piston and cylinder device 37 pivoted to the truck chassis at 38 and to the frame 13 at 39. By the closing of valves controlling the flow of hydraulic fluid to and from the hydraulic cylinder of the device 37, the piston rod may be locked against movement, thus fixing the frame 13 in position. The electromagnet 32 is then energized and utilized to hoist the weight 30 from the position shown in dotted lines in FIG. 2 to the position shown in solid lines, with the upward travel thereof being limited by a stop member 41 adjustably fixed to the top of guide rod 26. The opening 28 in the top member 16 is sufficiently larger in diameter than the diameter of the stop member 41 so as to permit the guide rod 26 to maintain its alignment at right angles to the face of the plate 23, thus assuring that the weight 30 will strike the force transmitting member 22 fairly even though the latter may be tilted slightly relative to the frame 13 by a slope or other unevenness of the ground.

When the drop is desired the electrical current to the electromagnet is cut off whereupon the weight falls by gravity, leaving the magnet in the upward position shown in FIG. 3, from which it may be lowered against the upper surface of the weight for a second operation. After the drop has been completed the valves to the piston and cylinder device 37 are opened and hydraulic fluid is applied to the cylinders 18 to raise the weight and force transmitting member so that the truck may be moved a few feet, or whatever distance is desired, for a subsequent drop.

By reason of the fact that the guide means 26 is affixed to the force transmitting member 22 which contacts the earth and the stop means 41 is attached to the guide rod, the vertical drop of the weight 30 is identical from drop to drop, and furthermore can be identical with two or more weight dropping apparatuses of the type herein described. Because the vertical dropped distance is the same for all weights, they can be released simultaneously by the simultaneous interruption of electrical energy to the electromagnets, and hence simultaneous impacts may be produced.

Furthermore, because the ground is in effect prestressed by the plate 23 being firmly placed thereagainst in the manner described, a better transfer of energy occurs. Because the frame 13 is vertically realigned for each drop in a new area, and the further freedom of movement of the plate 23 and guide rod 26 relative to the frame, eliminates any possibility that the weight may land askew.

To achieve a good transfer of energy the mass of the force transmitting member and guide means should be kept small in comparison with the mass of the weight 30. In the construction shown, the plate 23 is aluminum and the guide rod is steel tubing. The shock isolators 25 are provided for the purpose mechanically to isolate the mass of the truck from the plate 23 at frequencies exceeding the natural frequency of the spring weight system formed by the truck and the spring rate of the shock isolators.

I claim:
1. Seismic apparatus comprising a mobile carrier, a frame swingably mounted on the carrier, a force transmitting plate mounted at one end of the frame, elongated guide means mounted on the plate and extending therefrom independent of the frame, said plate having sufficient weight to orient the guide means into generally vertical position, means for moving the plate into contact with the ground and for pressing the same firmly thereagainst, a weight carried by the frame and slidably guided thereon by said guide means, means for dropping the weight from an elevated position to impact against the plate to deliver a seismic shock into the earth, a stop member adjustably carried by the frame and positioned adjacent the upper end of said guide means, and means for adjusting the position of said stop member relative to said frame to locate said elevated position in any desired location.

2. Seismic apparatus comprising a mobile carrier, a frame swingably mounted on the carrier, a force transmitting plate mounted at one end of the frame for pivotal movement relative thereto, elongated guide means carried by the plate and movable therewith relative to said frame, said plate having sufficient weight to swing the frame into generally vertical position to orient the guide means vertically, means for locking the frame in vertical position, means for moving the plate into contact with the ground and for pressing the same firmly thereagainst, the mounting of said plate permitting the same to pivot into engagement with the ground over substantially its entire lower face, a weight carried by the frame and slidably guided thereon by said guide means, means for dropping the weight from an elevated position to impact against the plate to deliver a seismic shock into the earth, and means carried by the guide means to locate said elevated position.

3. The seismic apparatus of claim 2 including a quick release device carried by the frame for raising the weight above the plate and releasing it at said elevated position.

4. The seismic apparatus of claim 3 wherein the quick release device is an electromagnet.

References Cited
UNITED STATES PATENTS

| | | | |
|---|---|---|---|
| 2,620,766 | 12/1952 | Seavey | 181—.5 |
| 3,189,121 | 6/1965 | Vander Stoep | 181—.5 |
| 3,209,854 | 10/1965 | Williams | 181—.5 |
| 3,277,977 | 10/1966 | Silverman | 181—.5 |
| 3,302,744 | 2/1967 | Lemm | 181—.5 |
| 2,234,831 | 3/1941 | Porter | 181—.5 |
| 3,318,411 | 5/1967 | Doubt | 181—.5 |

BENJAMIN A. BORCHELT, *Primary Examiner.*

G. H. GLANZMAN, *Assistant Examiner.*